(12) United States Patent
Liu et al.

(10) Patent No.: US 8,586,868 B2
(45) Date of Patent: Nov. 19, 2013

(54) PARALLEL STRUCTURE HIGH CONDUCTIBILITY CABLE WITH CONDUCTOR KEEPER

(76) Inventors: Li-Wen Liu, Shulin (TW); Wei-Jen Liu, Shulin (TW)

( * ) Notice: Subject to any disclaimer, the term of this patent is extended or adjusted under 35 U.S.C. 154(b) by 548 days.

(21) Appl. No.: 12/984,718

(22) Filed: Jan. 5, 2011

(65) Prior Publication Data
US 2011/0192647 A1     Aug. 11, 2011

(30) Foreign Application Priority Data
Feb. 10, 2010    (TW) .............................. 99202728 U

(51) Int. Cl.
*H02G 15/02* (2006.01)
*H01R 4/22* (2006.01)
*H01R 4/60* (2006.01)

(52) U.S. Cl.
USPC .................. 174/94 R; 174/113 C; 174/75 R; 174/97

(58) Field of Classification Search
USPC .............................. 174/94 R, 97, 75 R, 113 C
See application file for complete search history.

(56) References Cited

U.S. PATENT DOCUMENTS

| | | | |
|---|---|---|---|
| 1,904,162 A * | 4/1933 | Milliken | 174/114 S |
| 1,989,930 A * | 2/1935 | Jaques | 174/75 R |
| 3,279,031 A * | 10/1966 | Eyraud et al. | 29/33 R |
| 3,598,899 A * | 8/1971 | Katz | 174/119 R |
| 3,603,715 A * | 9/1971 | Eilhardt et al. | 174/15.5 |
| 4,345,370 A * | 8/1982 | Cartier et al. | 29/828 |
| 4,600,268 A * | 7/1986 | Spicer | 385/103 |
| 4,671,610 A * | 6/1987 | Kitayama et al. | 385/105 |
| 5,101,467 A * | 3/1992 | Bernard | 385/112 |
| 5,599,202 A * | 2/1997 | Key | 439/459 |
| 6,049,042 A * | 4/2000 | Avellanet | 174/128.1 |
| 6,566,604 B2 * | 5/2003 | Booth et al. | 174/110 R |
| 7,214,883 B2 * | 5/2007 | Leyendecker | 174/110 R |
| 7,399,927 B2 * | 7/2008 | Glew | 174/113 C |
| 7,494,377 B2 * | 2/2009 | Yohn et al. | 439/460 |
| 7,772,495 B2 | 8/2010 | Wu et al. | |
| 7,934,311 B2 * | 5/2011 | Varkey | 29/825 |
| 2003/0178224 A1 * | 9/2003 | Goto | 174/133 R |
| 2004/0168822 A1 * | 9/2004 | Goto | 174/133 R |
| 2011/0095857 A1 * | 4/2011 | Goto et al. | 336/208 |

* cited by examiner

*Primary Examiner* — Timothy Thompson
*Assistant Examiner* — Nathan Milakovich
(74) *Attorney, Agent, or Firm* — Birch, Stewart, Kolasch & Birch, LLP

(57) ABSTRACT

A cable has a conductor keeper, multiple bare conductors, a dielectric tape, a plastic jacket and two copper cylinders. The conductor keeper has multiple grooves. Each bare conductor is mounted in a corresponding groove of the conductor keeper and has a first end and a second end. The first end and second end of the bare conductor protrude out of the conductor keeper respectively so as to form two spaces. The dielectric tape is wrapped around the conductor keeper. The plastic jacket is coated around the dielectric tape. Two copper cylinders are mounted in the spaces of the bare conductors respectively to make the bare conductors surround the copper cylinders and the bare conductors connect to each other in parallel. Therefore, the skin effect is minimized and the bare conductors are efficient in that power consumption and emission of carbon dioxide during copper-smelting are significantly reduced.

15 Claims, 9 Drawing Sheets

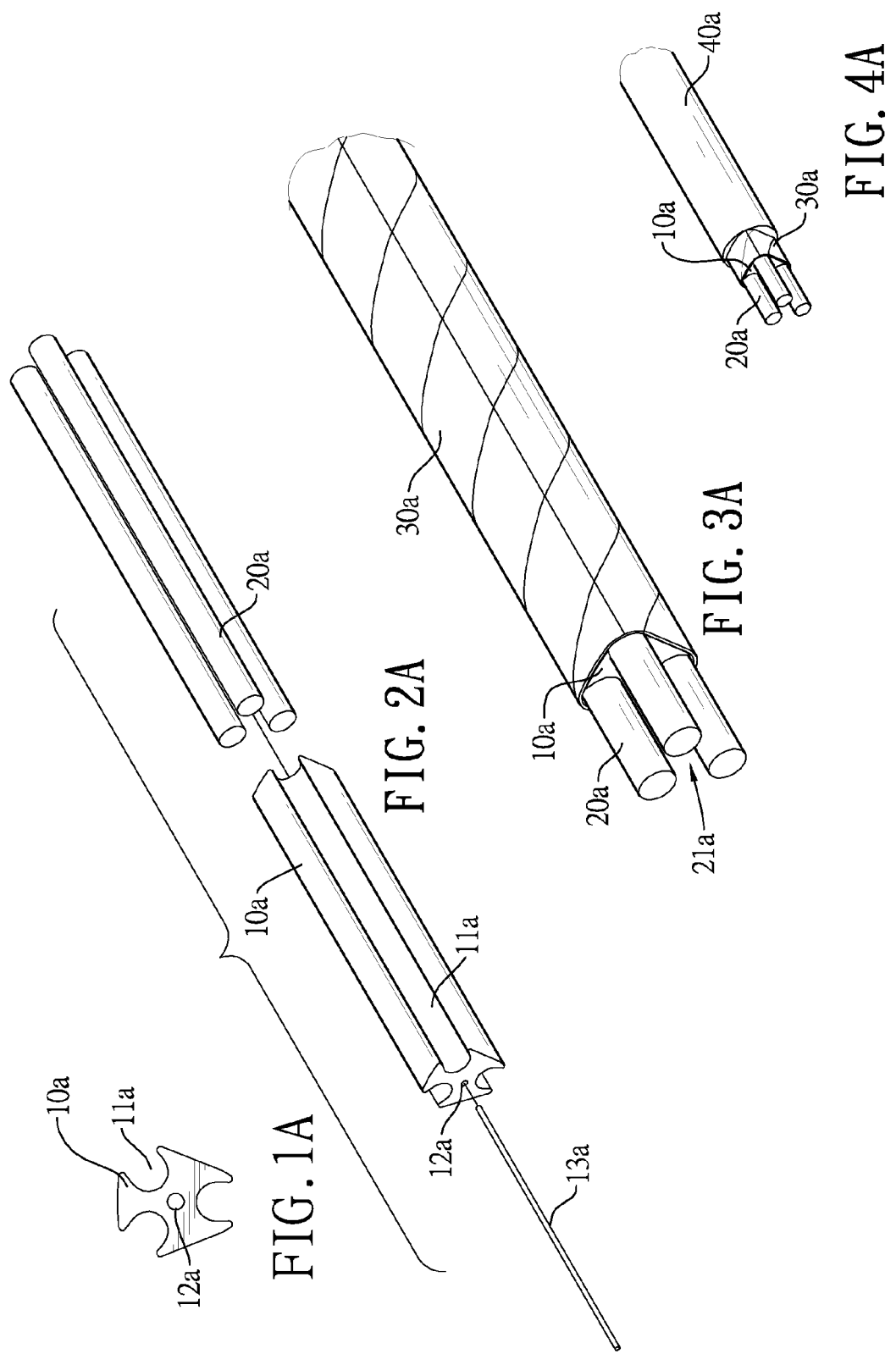

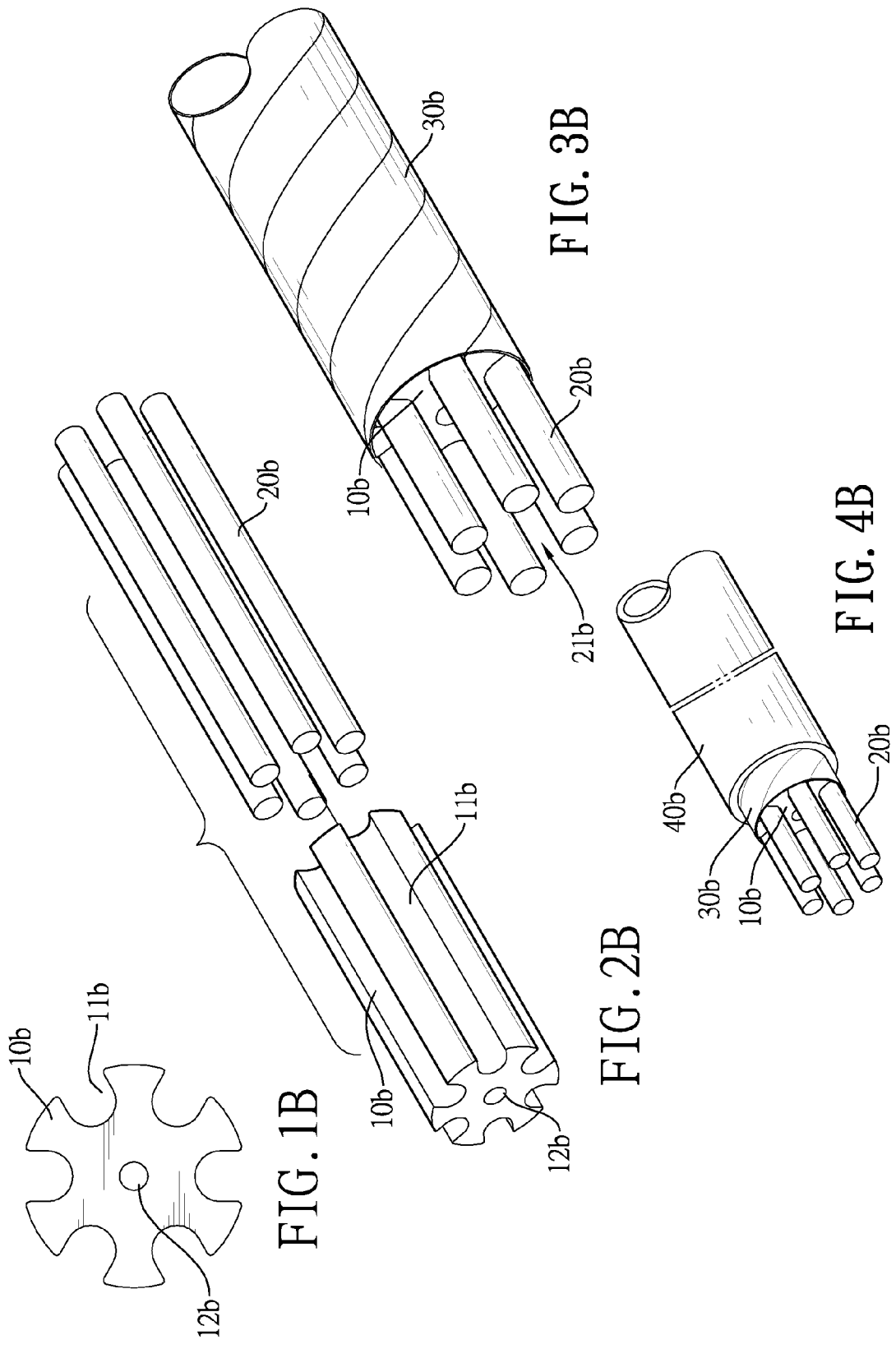

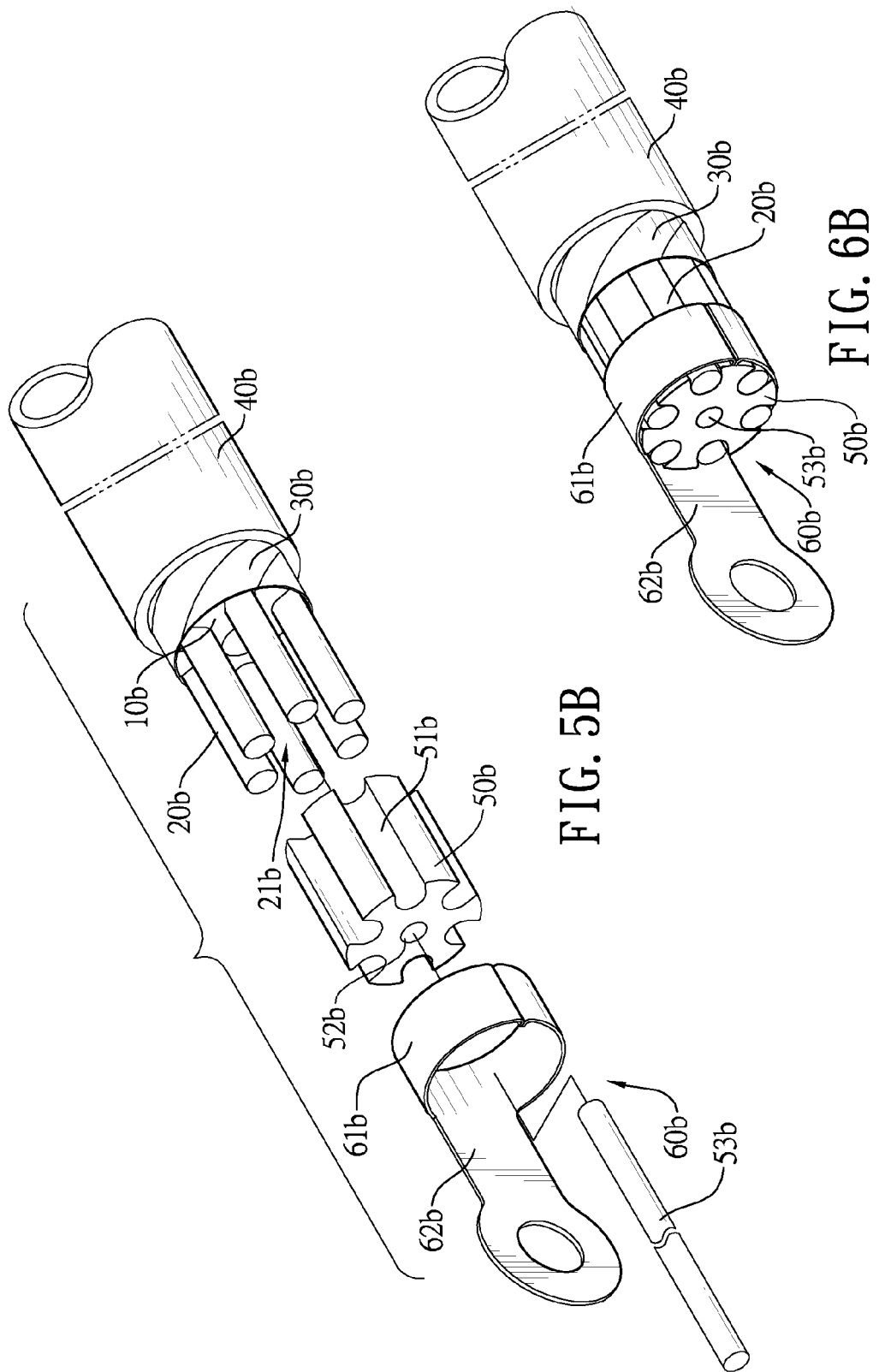

US 8,586,868 B2

PARALLEL STRUCTURE HIGH CONDUCTIBILITY CABLE WITH CONDUCTOR KEEPER

BACKGROUND OF THE INVENTION

1. Field of the Invention

The present invention relates to a cable, and more particularly to a high-conductibility and energy-saving cable.

2. Description of the Prior Arts

With reference to FIG. 13, a conventional cable is used to carry electric currents and comprises multiple conductors 100, a dielectric tape 200 and a plastic jacket 300. The conductors 100 are stranded and bonded together to form larger conductors that can be fixed to prevent disassembling. The dielectric tape 200 is wrapped around the conductors 100. The plastic jacket 300 is coated around the dielectric tape 200.

However, the conductors 100 are stranded by a stranding machine and yet the stranding machine has disadvantages such as large working area and high equipment costs. Besides, electric currents tend to run along a surface of each conductor 100, known as the skin effect. The skin effect is a tendency of an alternating electric current (AC) to distribute itself within the conductor 100 so that current near the surface of the conductor 100 is greater than that at the core of the conduct 100. The skin effect causes resistance of the conductor 100 to increase with the frequency of the current.

To overcome the shortcomings, the present invention provides a cable to mitigate or obviate the aforementioned problems.

SUMMARY OF THE INVENTION

The main object of the present invention is to provide a high-conductibility and energy-saving cable for efficient productivity.

A cable in accordance with the present invention comprises a conductor keeper, multiple bare conductors, a dielectric tape, a plastic jacket and two copper cylinders. The conductor keeper has two end surfaces, an annular surface and multiple grooves. The grooves are formed longitudinally in the annular surface of the conductor keeper and are formed through two end surfaces of the conductor keeper. Each bare conductor is mounted in a corresponding groove of the conductor keeper and has a first end and a second end. The first end and second end of the bare conductor protrude out of the two end surfaces of the conductor keeper respectively so as to form two spaces. The dielectric tape is wrapped around the conductor keeper. The plastic jacket is coated around the dielectric tape. The copper cylinders are mounted in the spaces of the bare conductors respectively to make the bare conductors surround the copper cylinders and the bare conductors connect to each other in parallel. Therefore, the bare conductors can be fixed by the conductor keeper without being stranded by a stranding machine so production efficiency is improved while costs reduced. Furthermore, the bare conductors are connected in parallel via the copper cylinders so the skin effect can be minimized.

Other objectives, advantages and novel features of the invention will become more apparent from the following detailed description when taken in conjunction with the accompanying drawings.

BRIEF DESCRIPTION OF THE DRAWINGS

FIG. 1A is an enlarged front view of a conductor keeper in accordance with the present invention;

FIG. 2A is an exploded perspective view of a conductor keeper and bare conductors of a cable in accordance with the present invention;

FIG. 3A is a partially enlarged perspective view of a conductor keeper, bare conductors and a dielectric tape of a cable in accordance with the present invention;

FIG. 4A is a partially enlarged perspective view of a conductor keeper, bare conductors, a dielectric tape and a plastic jacket of a cable in accordance with the present invention;

FIG. 1B is an enlarged front view of another embodiment of a conductor keeper in accordance with the present invention;

FIG. 2B is an exploded perspective view of another embodiment of a conductor keeper and bare conductors of a cable in accordance with the present invention;

FIG. 3B is a partially enlarged perspective view of another embodiment of a conductor keeper, bare conductors and a dielectric tape of a cable in accordance with the present invention;

FIG. 4B is a partially enlarged perspective view of another embodiment of a conductor keeper, bare conductors, a dielectric tape and a plastic jacket of a cable in accordance with the present invention;

FIG. 5B is a partially enlarged exploded perspective view of the cable in accordance with the present invention;

FIG. 6B is a partially enlarged perspective view of the cable in FIG. 5B;

DETAILED DESCRIPTION OF THE PREFERRED EMBODIMENTS

Figure 7A:
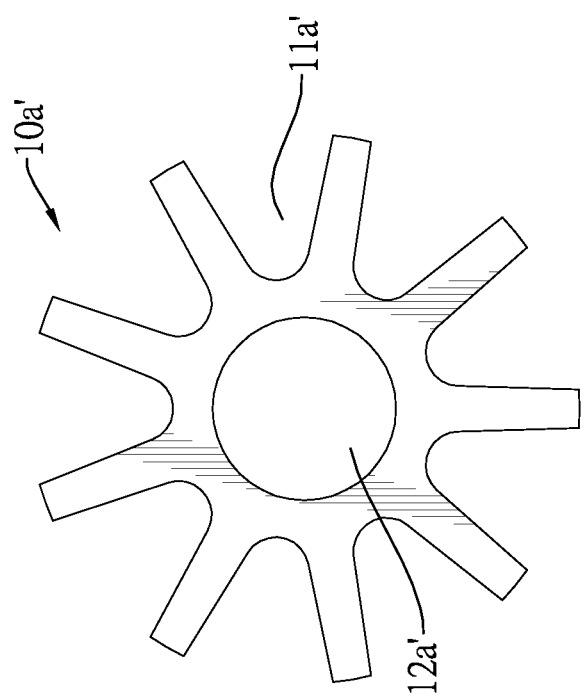
FIG. 7A is an enlarged front view of a cable keeper of a heavy power cable in accordance with the present invention.

With reference to FIGS. 1A to 4B, a cable in accordance with the present invention comprises a conductor keeper 10a, 10b, multiple bare conductors 20a,20b, a dielectric tape 30a, 30b and a plastic jacket 40a, 40b.

With reference to FIGS. 1A and 1B, the conductor keeper 10a,10b is a column, is made of plastic such as polyethylene (PE) or the like, is elongated and has two end surfaces, an annular surface, a central axis, multiple grooves 11a,11b and a through hole 12a,12b. The grooves 11a,11b are formed longitudinally in the annular surface of the conductor keeper 10a,10b and are formed through two end surfaces of the conductor keeper 10a,10b, and each groove 11a,11b has a concave bottom. The through hole 12a,12b is formed axially through the conductor keeper 10a,10b along the central axis. A poly wire 13a shown in FIG. 2A is mounted through the through hole 12a of the conductor keeper 10a to enhance the structural strength of the conductor keeper 10a. In preferred embodiments, the conductor keeper 10a shown in FIG. 1A is triangular in cross section and the conductor keeper 10b shown in FIG. 1B is circular in cross section.

With reference to FIGS. 2A and 2B, each bare conductor 20a,20b is circular in cross section, is mounted in one of the grooves 11a,11b in the conductor keeper 10a,10b and has a radian, a first end and a second end. The radian of the bare conductor 20a,20b corresponds to a radian of the corresponding groove 11a,11b of the conductor keeper 10a,10b. The first end and second end of the bare conductor 20a,20b protrude out of the two end surfaces of the conductor keeper 10a,10b respectively so as to form two spaces 21a,21b between the first ends and second ends of the bare conductors 20a,20b as shown in FIGS. 3A and 3B. The bare conductors 20a,20b are made of metal and may be copper wires, copper-clad steel wires, copper-clad aluminum wires or aluminum wires.

With reference to FIGS. 3A and 3B, the dielectric tape 30a,30b is wrapped around the annular surface of the conductor keeper 10a,10b. The dielectric tape 30a,30b may be made of polyethylene (PE) or may be paper.

With reference to FIGS. 4A and 4B, the plastic jacket 40a,40b is coated around the dielectric tape 30a,30b. The plastic jacket 40a,40b may be made of polyvinyl chloride (PVC) or may be a halogen-free insulation.

With reference to FIGS. 5B and 6B, a cable in accordance with the present invention further comprises two copper cylinders 50b and two terminals 60b.

The copper cylinders 50b are mounted in the spaces 21b of the bare conductors 20b respectively to make the bare conductors 20b surround the copper cylinders 50b and the bare conductors 20b connect to each other in parallel. Each copper cylinder 50b has two end surfaces, an annular surface, a central axis, multiple recesses 51b and a central hole 52b. The recesses 51b are formed longitudinally in the annular surface of the copper cylinder 50b and are formed through two end surfaces of the copper cylinder 50b. The recesses 51b align respectively with the grooves 11b of the conductor keeper 10b and hold respectively the ends of the bare conductors 20b inside. The central hole 52b is formed axially through the copper cylinder 50b along the central axis and aligns with the through hole 12b of the conductor keeper 10b. A poly wire 53b is mounted through the central holes 52b of the copper cylinders 50b and the through hole 12b of the conductor keeper 10b to enhance the structural strength of the conductor keeper 10b and the cylinders 50b.

The terminals 60b are mounted on the first ends and second ends of the bare conductors 20b respectively and each terminal 60b has a collar 61b and a mounting unit 62b protruding from the collar 61b longitudinally. The two collars 61b are mounted around the first ends and second ends of the bare conductors 20b respectively.

With reference to FIGS. 7A to and 10A, in another embodiment, a heavy power cable in accordance with the present invention comprise a cable keeper 10a', multiple cables, an outer dielectric tape 30a', an outer plastic jacket 40a', two copper cylinders 50a and two terminals 60a.

With reference to FIG. 7A, the cable keeper 10a' is a column and has two end surfaces, an annular surface, a central axis, multiple grooves 11a' and a through hole 12a'. The grooves 11a' are formed longitudinally in the annular surface of the cable keeper 10a' and are formed through two end surfaces of the cable keeper 10a'. The through hole 12a' is formed axially through the cable keeper 10a' along the central axis.

Figure 8A:
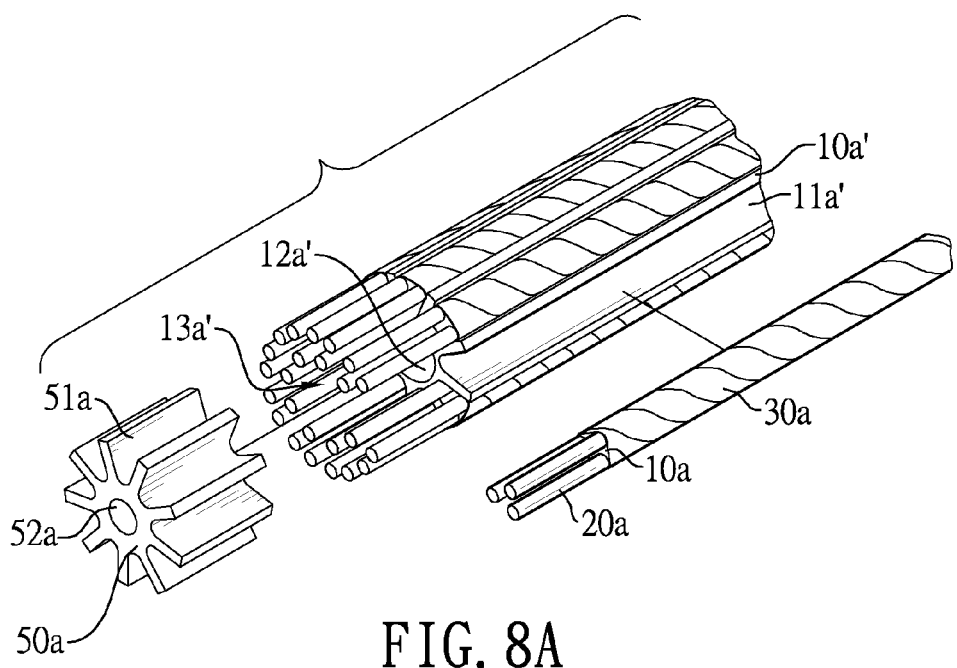
FIG. 8A is an partially enlarged exploded perspective view of a cable keeper, cables and a copper cylinder of a heavy power cable in accordance with the present invention.

With reference to FIG. 8A, the cables have an abovementioned structure but without plastic jackets and each cable is mounted in one of the grooves 11a' in the cable keeper 10a' and has first end and a second end. The first end and second end of the cable protrude out of the two end surfaces of the cable keeper 10a' respectively so as to form two spaces 13a' between the first ends and second ends of the cables.

Figure 9A:
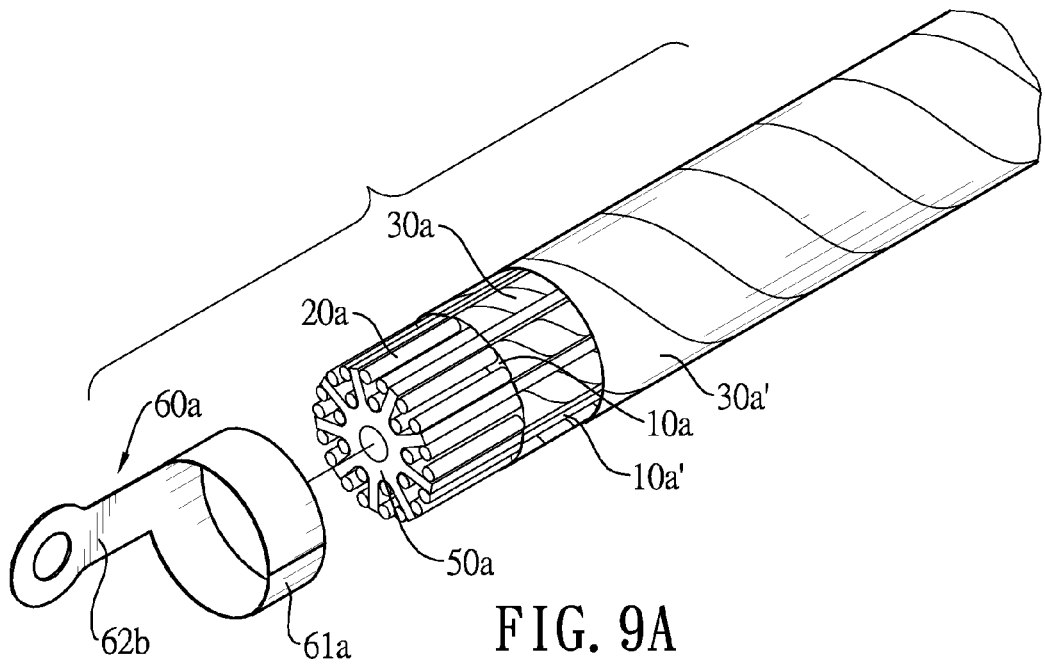
FIG. 9A is an partially enlarged exploded perspective view of a cable keeper, cables, a copper cylinder and a terminal of a heavy power cable in accordance with the present invention.

With reference to FIG. 9A, the outer dielectric tape 30a' is wrapped around the annular surface of the cable keeper 10a'.

Figure 10A:
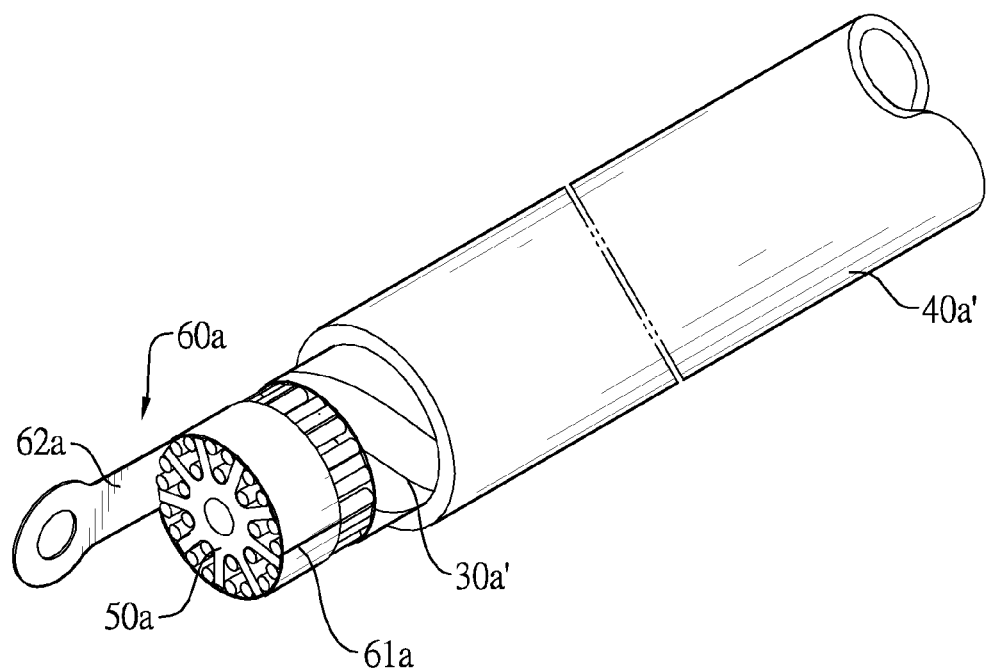
FIG. 10A is an partially enlarged perspective view of the heavy power cable in FIG. 9A.
Figure 11A:
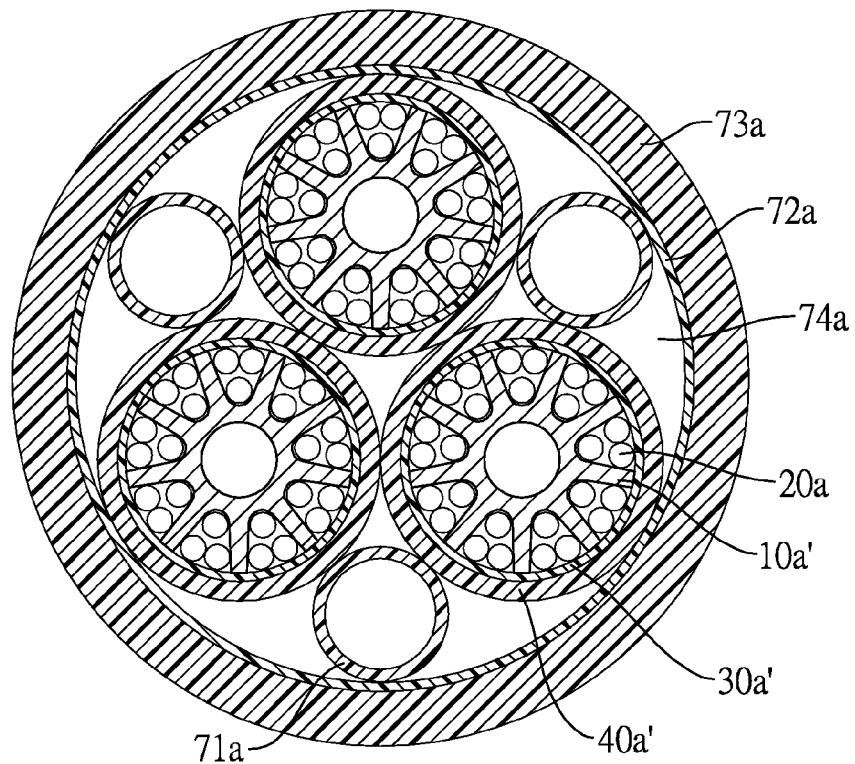
FIG. 11A is an enlarged front view in partial section of the cable assembly in accordance with the present invention.
Figure 12A:
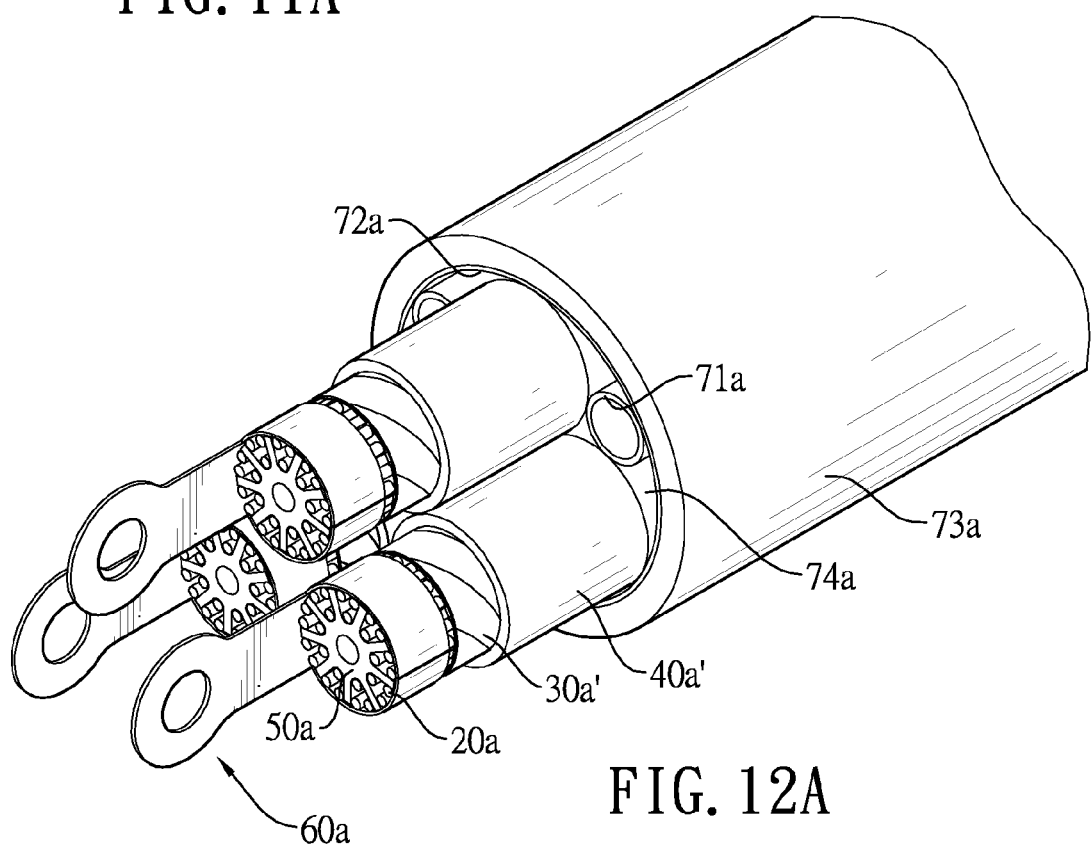
FIG. 12A is a partially enlarged perspective view of a cable assembly in FIG. 11A.
Figures 11B, 12B:
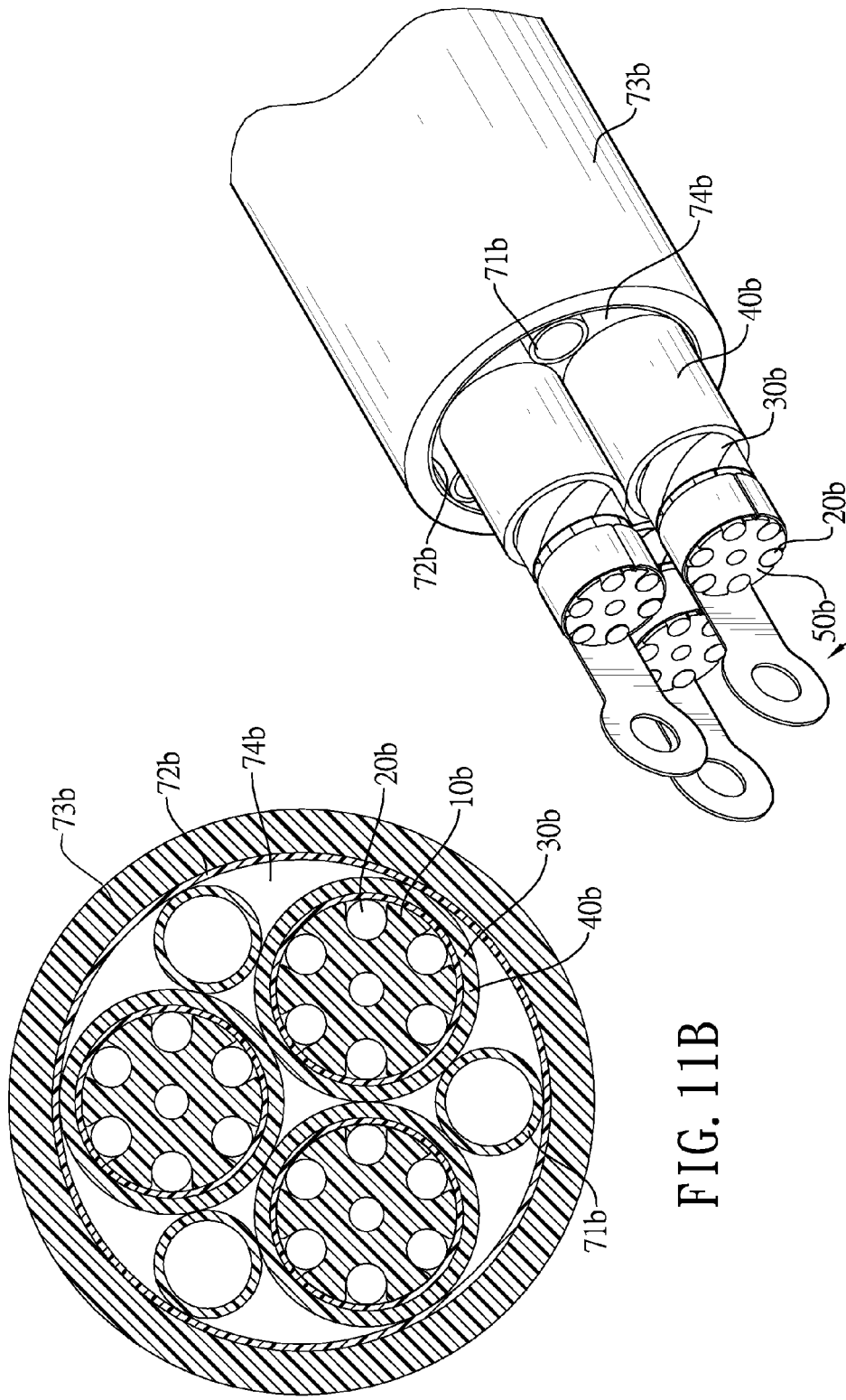
FIG. 11B is an enlarged front view in partial section of another embodiment of the cable assembly in accordance with the present invention.
FIG. 12B is a partially enlarged perspective view of another embodiment of a cable assembly in FIG. 11B.
Figure 13:
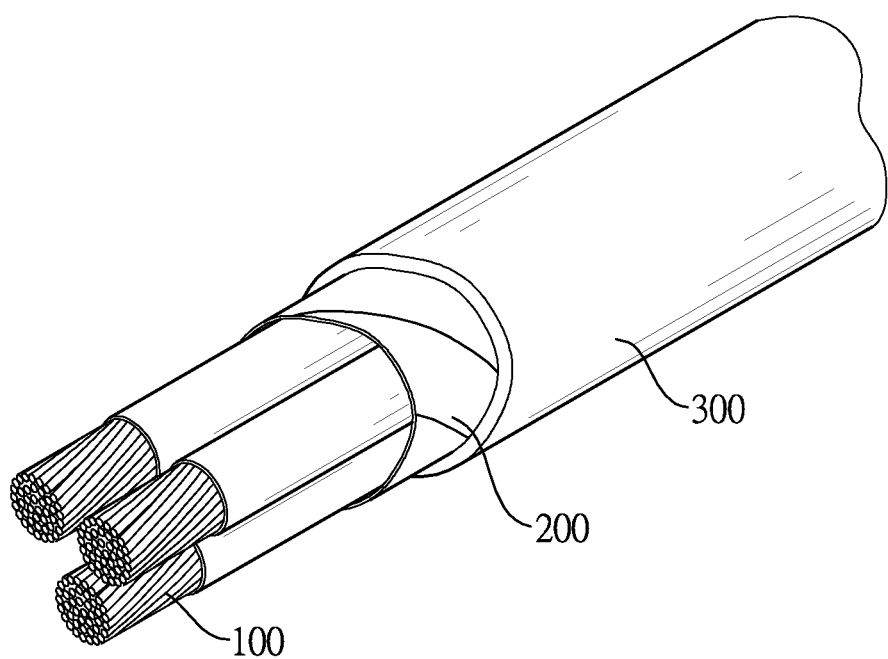
FIG. 13 is a partially enlarged perspective view of a conventional cable in accordance with the prior art.

With reference to FIG. 10A, the outer plastic jacket 40a' is coated around the outer dielectric tape 30a'.

With reference to FIGS. 8A and 9A, the copper cylinders 50a are mounted in the spaces 13a' of the cables respectively to make the cables surround the copper cylinders 50a and the bare conductors 20a of the cables connect to each other in parallel. Each copper cylinder 50a has two end surfaces, an annular surface, a central axis, multiple recesses 51a and a central hole 52a. The recesses 51a are formed longitudinally in the annular surface of the copper cylinder 50a and are formed through two end surfaces of the copper cylinder 50a. The recesses 51a align respectively with the grooves 11a' of the cable keeper 10a' and hold respectively the ends of the cables inside. The central hole 52a is formed axially through the copper cylinder 50a along the central axis and aligns with the through hole 12a' of the cable keeper 10a'.

With reference to FIGS. 9A and 10A, the terminals 60a are mounted on the first ends and second ends of the cables respectively and each terminal 60a has a collar 61a and a mounting unit 62a protruding from the collar 61a longitudinally. The two collars 61a are mounted around the first ends and second ends of the cables respectively.

With reference to FIGS. 11A to 12B, a cable assembly in accordance with the present invention comprises multiple cables, multiple tubes 71a,71b, an insulation 72a,72b and a plastic sheath 73a,73b.

The cables have a structure as above-mentioned and are arranged parallelly to each other.

Each tube 71a,71b is mounted between two cables and is parallel to the cables. Multiple intervals 74a,74b are formed between the tubes 71a,71b and the cables for dissipating the heat.

The insulation 72a,72b is mounted around the cables and tubes 71a,71b and has a length shorter than that of the cables to make the terminals 60a,60b protrude out of the insulation 72a,72b.

The plastic sheath 73a,73b is coated around the insulation 72a,72b.

The cable in accordance with the present invention utilizes the conductor keeper 10a,10b to fix the bare conductors 20a, 20b so the bare conductors 20a,20b do not have to be stranded by a stranding machine, and production efficiency of the cable is therefore improved and cost for manufacturing the cable is reduced. Furthermore, in accordance with Ohm's law: $I_{total}=V(1/R_1+1/R_2+1/R_3+\ldots+1/Rn)$, the total current (I) is the sum of the currents through individual components when the components are connected in parallel. The bare conductors 20a,20b in accordance with the present invention are connected in parallel via the copper cylinders 50a,50b so the current of the bare conductors 20a,20b is greater as compared with the conventional cable and the skin effect can be minimized. The bare conductors 20a,20b are also more efficient in that power consumption and emission of carbon dioxide during copper-smelting are significantly reduced. Therefore, the high-conductibility and energy-saving cable in accordance with the present invention is contributing to environmental conservation and demonstrating greater efficiency in application.

TABLE 1

| Parallel structure high conductibility cable | | | | Conventional cable | | |
| --- | --- | --- | --- | --- | --- | --- |
| Average current (A/mm²) | Copper consumption (kg/km) | Conductor area (mm²) | Safety current (A) | Conductor area (mm²) | Copper consumption (kg/km) | Average current (A/mm²) |
| 11.42 | 31.2 | 3.5 | 40 | 8 | 71.19 | 5 |
| 10 | 93.35 | 12 | 120 | 50 | 435.1 | 2.4 |
| 9.5 | 266.7 | 30 | 285 | 150 | 1390 | 1.9 |

The above table shows that the average current of the cable in accordance with the present invention is 2.28 to 5 times greater than the conventional cable. Further, the cable in accordance with the present invention saves 50 to 80 percent of the copper material as compared with the conventional cable so is reduced electricity consumption and emission of carbon dioxide.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A cable comprising:
   a conductor keeper made of plastic, being elongated and having
      two end surfaces;
      an annular surface; and
      multiple grooves formed longitudinally in the annular surface of the conductor keeper and formed through two end surfaces of the conductor keeper;
   multiple bare conductors made of metal, each bare conductor mounted in one of the grooves of the conductor keeper and having a first end and a second end and the first end and second end of the bare conductor protruding out of the two end surfaces of the conductor keeper respectively so as to form two spaces between the first ends and second ends of the bare conductors;
   a dielectric tape wrapped around the annular surface of the conductor keeper;
   a plastic jacket coated around the dielectric tape; and
   two copper cylinders mounted in the spaces of the bare conductors respectively to make the bare conductors surround the copper cylinders and the bare conductors connect to each other in parallel;
   wherein each copper cylinder has
      two end surfaces;
      an annular surface; and
      multiple recesses formed longitudinally in the annular surface of the copper cylinder, formed through two end surfaces of the copper cylinder, aligning respectively with the grooves of the conductor keeper and holding respectively the ends of the bare conductors inside; and
   wherein each bare conductor is circular in cross section and has a radian corresponding to a radian of the corresponding groove of the conductor keeper.

2. The cable as claimed in claim 1 further comprising two terminals mounted on the first ends and second ends of the bare conductors respectively.

3. The cable as claimed in claim 2, wherein each terminal has
   a collar and the two collars mounted around the first ends and second ends of the bare conductors respectively; and
   a mounting unit protruding from the collar.

4. The cable as claimed in claim 1, wherein
   the conductor keeper further has a through hole formed through the conductor keeper; and
   each copper cylinder further has a central hole formed through the copper cylinder and aligning with the through hole of the conductor keeper.

5. The cable as claimed in claim 1, wherein the conductor keeper is triangular in cross section.

6. The cable as claimed in claim 1, wherein the conductor keeper is circular in cross section.

7. The cable as claimed in claim 1, wherein the conductor keeper is made of plastic.

8. The cable as claimed in claim 1, wherein the bare conductors are copper wires.

9. The cable as claimed in claim 1, wherein the bare conductors are copper-clad steel wires.

10. The cable as claimed in claim 1, wherein the bare conductors are copper-clad aluminum wires.

11. The cable as claimed in claim 1, wherein the bare conductors are aluminum wires.

12. The cable as claimed in claim 1, wherein the dielectric tape is made of polyethylene.

13. The cable as claimed in claim 1, wherein the dielectric tape is paper.

14. The cable as claimed in claim 1, wherein the plastic jacket is made of polyvinyl chloride.

15. The cable as claimed in claim 1, wherein the plastic jacket is a halogen-free insulation.

* * * * *